Oct. 13, 1942.　　　　J. T. FERRY　　　　2,298,558
AUTOMATIC STOP FOR TABULATORS
Filed March 21, 1939　　　11 Sheets-Sheet 3

INVENTOR
JOHN T. FERRY
BY *W. A. Spark*
ATTORNEY

Oct. 13, 1942.　　　　J. T. FERRY　　　2,298,558
AUTOMATIC STOP FOR TABULATORS
Filed March 21, 1939　　　11 Sheets-Sheet 4
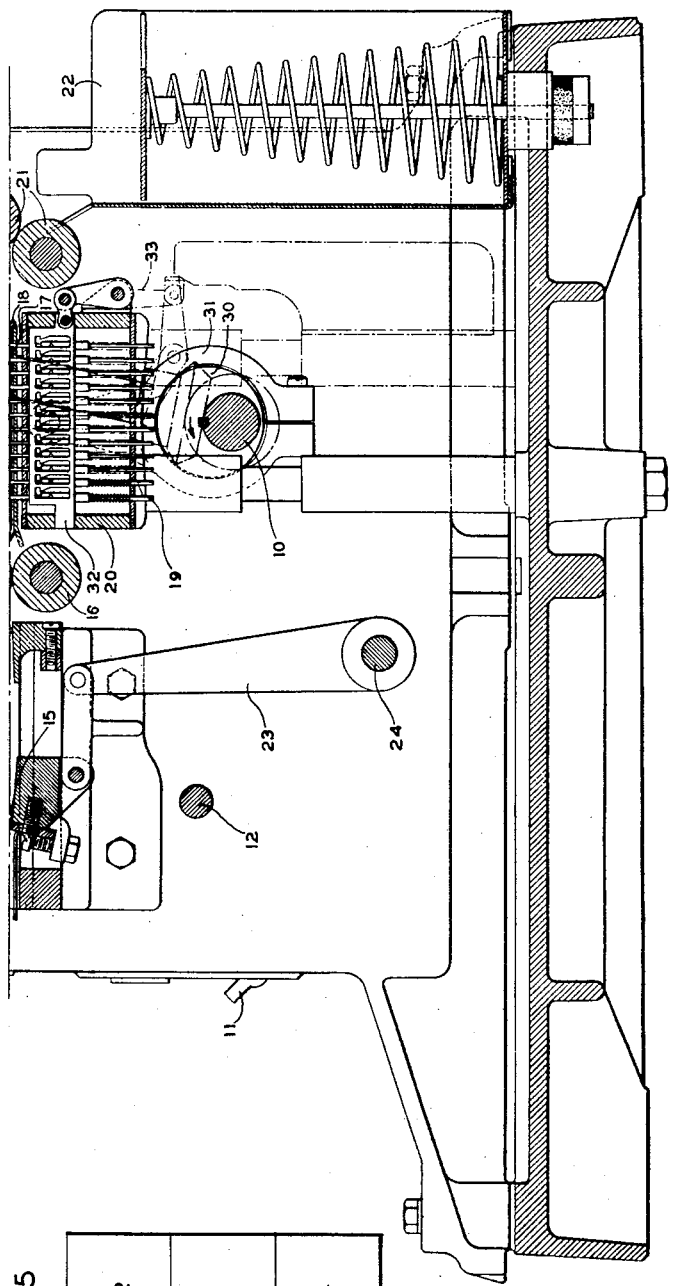
FIG. 4
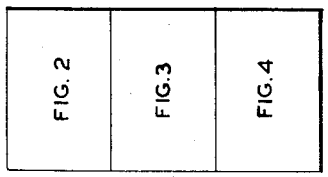
INVENTOR
JOHN T. FERRY
BY *H. A. Sparks*
ATTORNEY

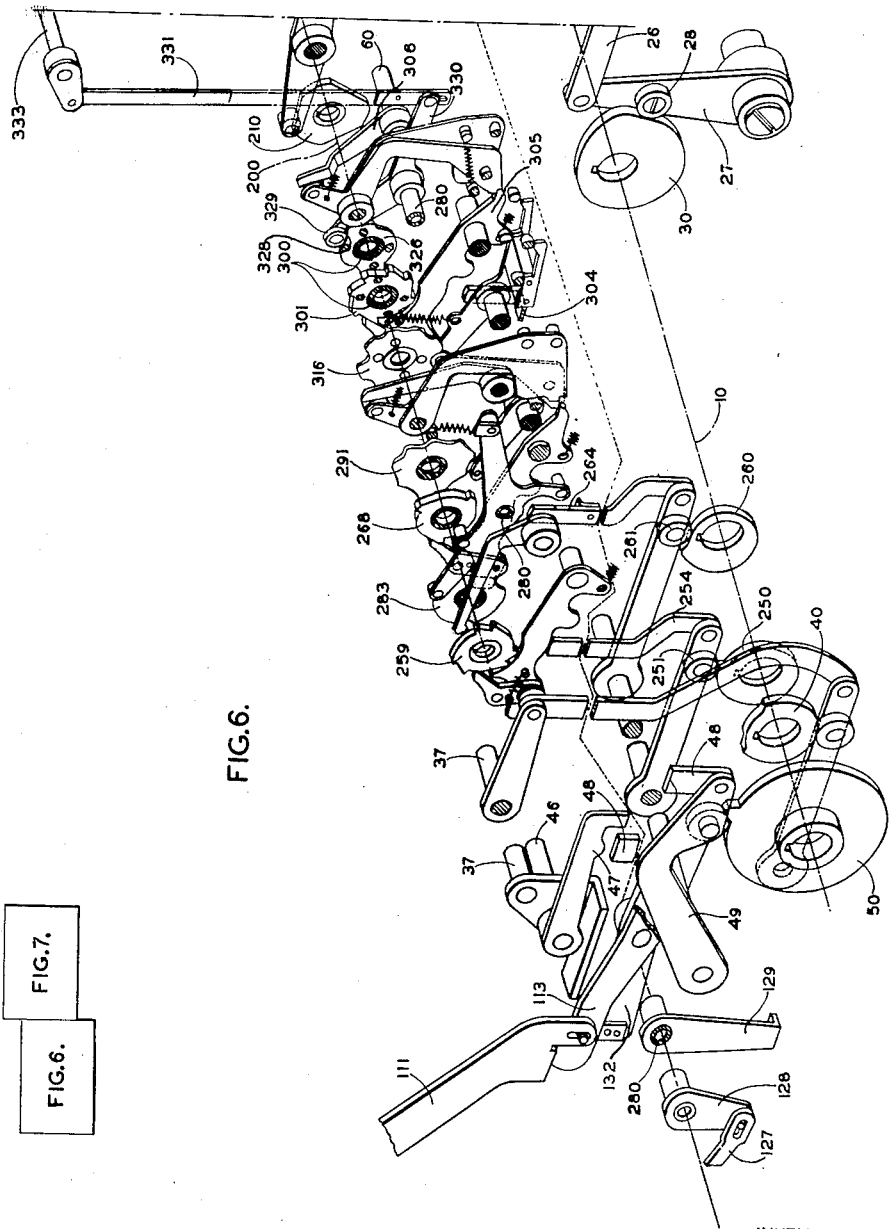

Oct. 13, 1942.    J. T. FERRY    2,298,558
AUTOMATIC STOP FOR TABULATORS
Filed March 21, 1939    11 Sheets-Sheet 6
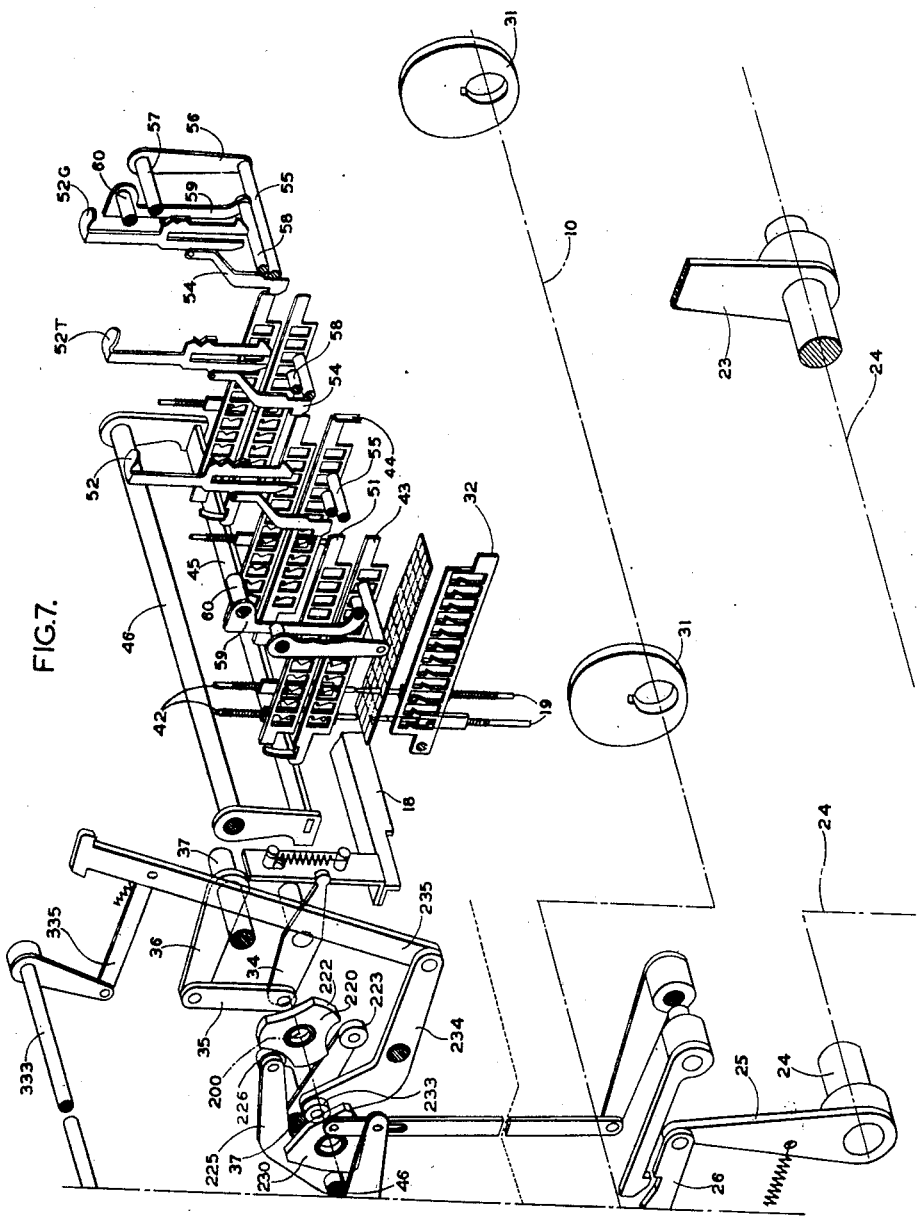
INVENTOR
JOHN T. FERRY
BY *H. A. Sparks*
ATTORNEY

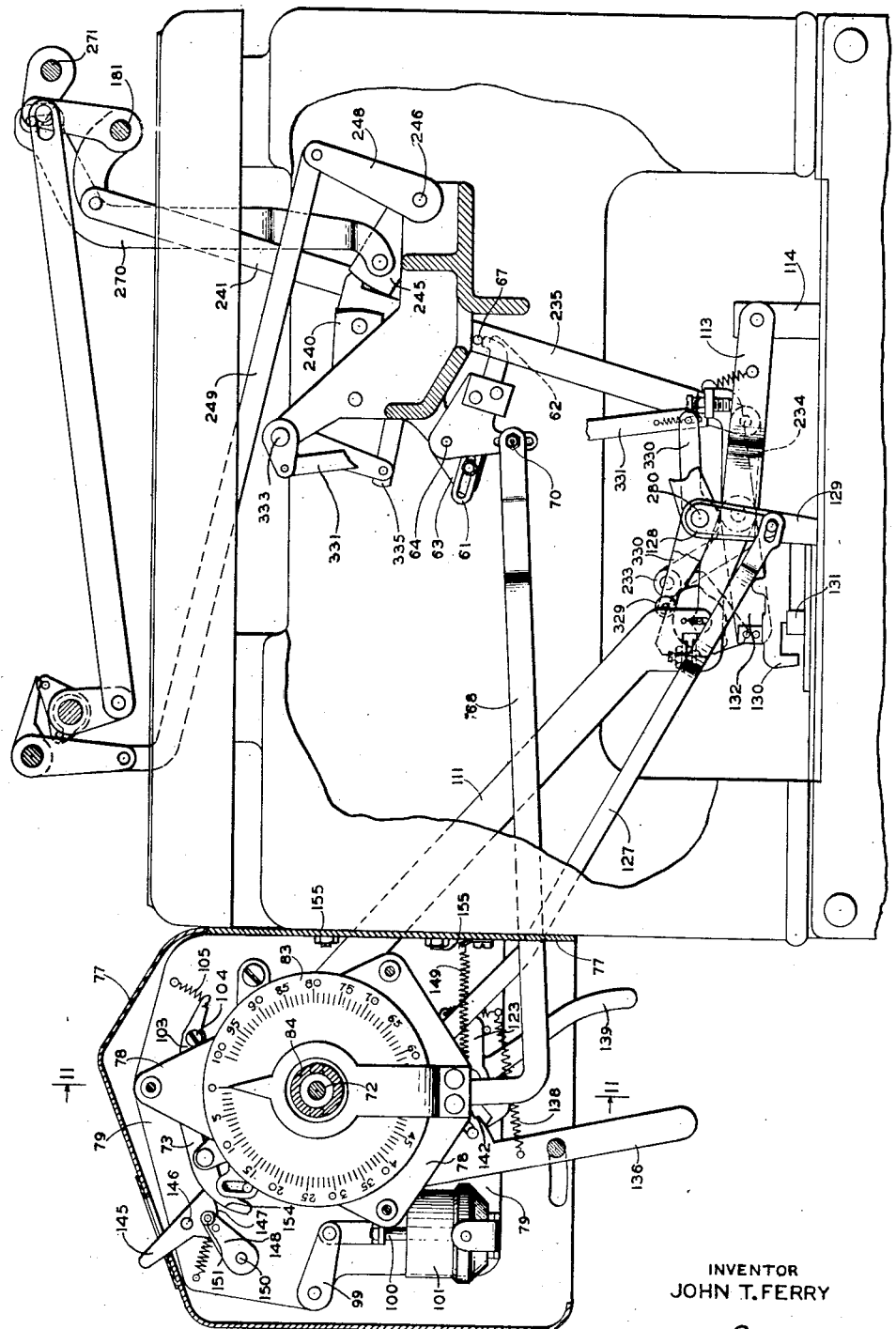

Oct. 13, 1942.    J. T. FERRY    2,298,558
AUTOMATIC STOP FOR TABULATORS
Filed March 21, 1939    11 Sheets-Sheet 8

INVENTOR
JOHN T. FERRY
BY W. A. Sparks
ATTORNEY

Oct. 13, 1942.  J. T. FERRY  2,298,558
AUTOMATIC STOP FOR TABULATORS
Filed March 21, 1939   11 Sheets-Sheet 9

INVENTOR
JOHN T. FERRY
BY *H. A. Sparks*
ATTORNEY

Oct. 13, 1942.    J. T. FERRY    2,298,558
AUTOMATIC STOP FOR TABULATORS
Filed March 21, 1939    11 Sheets-Sheet 10

INVENTOR
JOHN T. FERRY
BY *H. A. Sparks*
ATTORNEY

Oct. 13, 1942.                J. T. FERRY                2,298,558
                      AUTOMATIC STOP FOR TABULATORS
                      Filed March 21, 1939       11 Sheets-Sheet 11
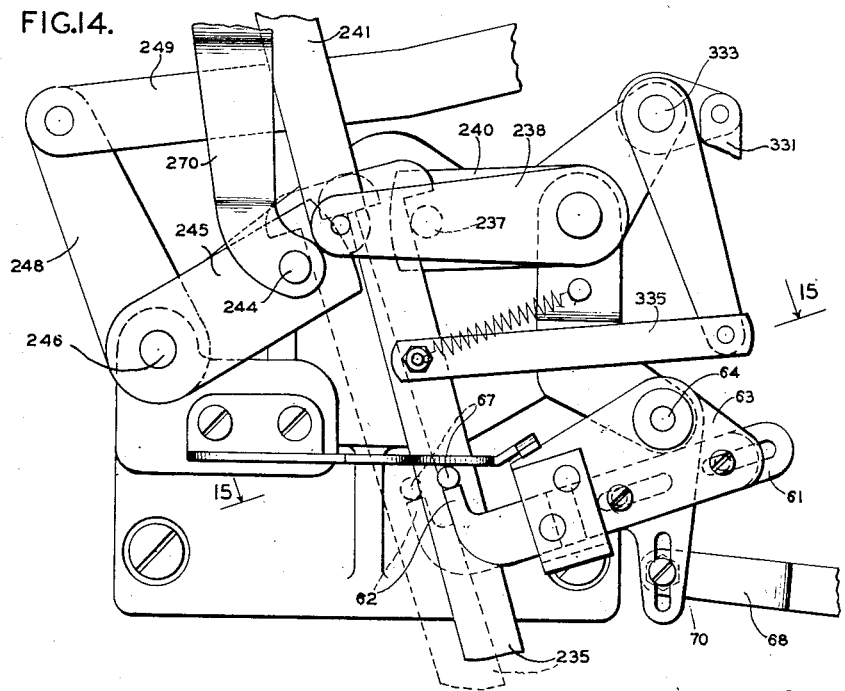
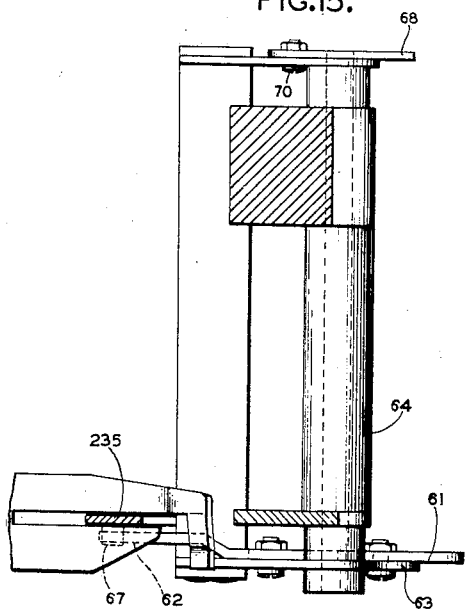
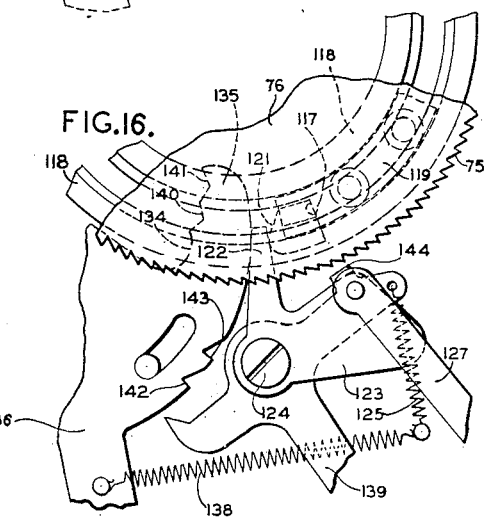
INVENTOR
JOHN T. FERRY
BY *W. C. Sparks*
ATTORNEY Patented Oct. 13, 1942

2,298,558

UNITED STATES PATENT OFFICE 2,298,558

AUTOMATIC STOP FOR TABULATORS

John T. Ferry, Ilion, N. Y., assignor to Remington Rand Inc., Buffalo, N. Y., a corporation of Delaware Application March 21, 1939, Serial No. 263,157

1 Claim. (Cl. 235—61.6)

This invention relates to tabulating machines adapted to record data items from stacks of record cards, and it more particularly relates to automatic devices for stopping such machines after a predetermined number of specific operations have been concluded.

The tabulating machine of which the present invention is an improvement is disclosed in a patent to Powers No. 1,245,502, dated November 6, 1917, and in patents to W. W. Lasker 2,044,119, dated June 16, 1936, and 2,066,406, dated January 5, 1937.

An automatic stop device of somewhat similar nature to the present invention is disclosed in a patent to W. W. Lasker 2,034,102, dated March 17, 1936. This patent discloses a machine in which an adjustable stopping device is actuated by the number of printing operations, rather than the number of total taking operations.

The principal object of the present invention is to provide a stop device for a tabulating machine which will stop the machine after a predetermined variable number of total taking operations.

Another object of the invention is to provide a mechanism which will stop a tabulating machine after a predetermined variable number of grand total-taking operations.

Another object of the invention is to provide a mechanism which will stop a tabulating machine after a predetermined variable number of impressions have been made, whether of items and totals separately or of items and totals combined.

Another object is to provide a stop device for a tabulating mechanism which may be adjusted easily and manually set for any number of total-taking operations from one to one hundred.

Another object is to provide a convenient means of normalizing the control mechanism of the stopping unit.

Still another object is the provision of a stopping mechanism which may easily be attached to a tabulating machine.

Other objects and structural details of the invention will be apparent from the following description when read in connection with the accompanying drawings, wherein, Fig. 1 is a side elevation of the tabulator showing the automatic stop mechanism attached at the rear;

Figs. 2, 3, and 4 represent a conventional right-hand sectional elevation through a typical Powers tabulator equipped with the invention;

Fig. 5 indicates the manner in which Figs. 2, 3, and 4 are arranged;

Figs. 6 and 7 represent an exploded isometric view of the total taking control mechanism and a portion of the card sensing mechanisms;

Fig. 8 indicates the manner in which Figs. 6 and 7 are arranged;

Fig. 9 is a side elevation of the automatic stop mechanism with some parts shown in section, indicating the manner in which the stop mechanism is connected to the total-taking mechanism;

Fig. 14 is a detailed side view of the total-taking link, total selecting mechanism and the automatic stop actuating lever;

Fig. 15 is a sectional view taken along line 15—15 of Fig. 14;

Fig. 16 is a fragmentary detailed side view of the compensating lever and its retaining pawl; and Fig. 17 shows an alternate form of stop actuating lever with which both totals and grand totals may be counted.

Figure 1:
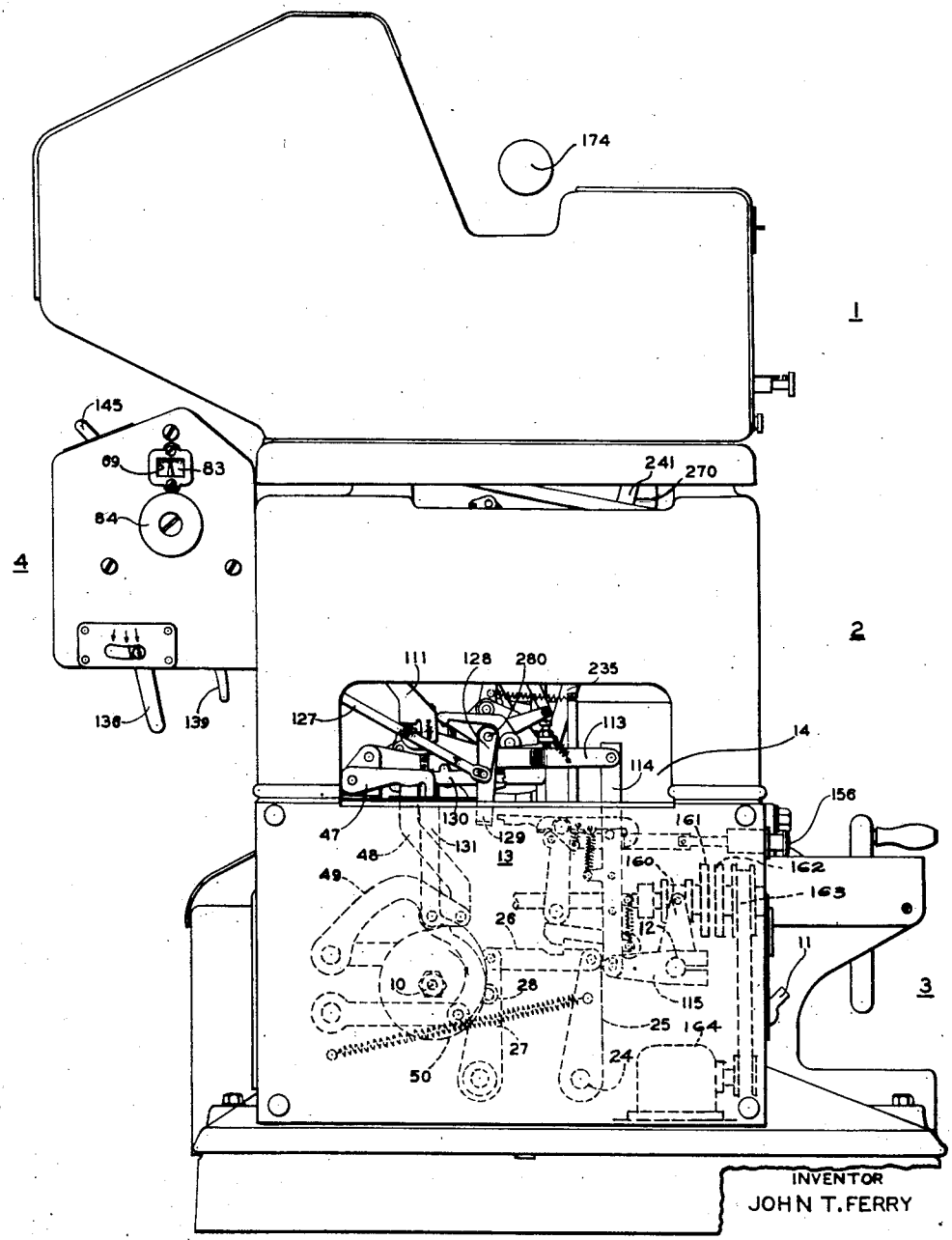

A number of the expressions frequently used herein, although well known in the art, are defined for the sake of clarity, as follows:

Group—the smallest subdivision of records to be tabulated, comprising one or more record cards.

Grand group—the next larger subdivision of records to be tabulated, comprising one or more groups of record cards.

Group total—the total of the quantitative data contained in all the cards of a group.

Grand group total—the total of the quantitative data contained in all the cards of a grand group.

Group total taking cycle—the cycle in which the group total accumulator is cleared and the group total printed on the report sheet. In addition, in the present instances, the group total is transferred to the grand total accumulator, and the total taking control mechanism is normalized.

Grand group total taking cycle—the cycle in which the grand total accumulator is cleared and the grand total printed on the report sheet. In addition, in the present instance, the total-taking control mechanism is normalized.

In Patent No. 2,044,119 a total taking control mechanism is disclosed that is arranged to control total-taking operations in a tabulator having one or more group total accumulators. This control mechanism, operative upon a change of designation in successive records, is adapted to vary the normal tabulating functions of the machine and to control the sequence of operations necessary for taking a total in the Powers tabulator. For this purpose, the control mechanism operates through three steps to control first, a conditioning cycle in which the accumulator transfer mechanisms are normalized, second, a total taking cycle in which the group total is rolled out of the accumulator, and a third, a normalizing cycle in which the control mechanism is restored to rest position and the data in the new card is tabulated. In the patent to W. W. Lasker No. 2,066,406 issued January 5, 1937, the same control mechanism is adapted to control total taking and grand total taking operations in a tabulator equipped with the Powers direct subtraction and grand total mechanism. In a tabulator of this type, the items that comprise each group are entered into a group total accumulator during accumulating cycles, the totals of each group are transferred to a grand total accumulator during total taking operations, and the grand total of a plurality of groups is taken from the grand total accumulator during grand total taking operations. In this arrangement, the control mechanism operates as in Patent No. 2,044,119 during total taking operations, but in grand total operations, the accumulators are controlled by two control cards inserted in the card stack at the point where a grand total is required. The total taking control mechanism shown herein is a later development and is designed to control both total taking and grand total taking operations upon changes in group and grand group designations, respectively, and in each case, to retain the new card in the card chamber throughout the operation initiated thereby, so that the data contained therein may be tabulated in the succeeding accumulating cycle.

Although automatic stop mechanisms, based upon the principle disclosed herein, may be constructed for any type of tabulating machine in which successive totals are to be taken, the device shown herein is applied to a well known form of Powers tabulator in which it is particularly adapted to operate.

Since the stop mechanism is operated only by the total taking operations, a brief description of the tabulator and its operation is necessary in order to fully disclose the present invention.

The operations of the tabulator are controlled from a main drive shaft 10 (Figs. 1, 4, 6, and 7) which is driven by an electric motor 154, controlled by switch 11, and is connected thereto by means of a clutch 161, 162, mounted fast on rock shaft 12 controlled by a clutch operating mechanism generally designated by reference character 13 which is similar in function and operation to that disclosed in Patent 2,044,119, the arrangement being such that a cycle of operation is completed during each revolution of shaft 10.

As described in the above mentioned patents, the clutch mechanism is so arranged that when the machine is stopped it is always stopped at a given point in a cycle. The point selected is one at which the several machine elements are in such a position that the operator may conveniently perform any required manual operation such as the insertion of a new translator, the insertion of a new report sheet, the resetting of the change of designation sensing mechanism, etc. This condition occurs when shaft 10 (Figs. 1 and 4) is rotated to a position in which the keyway therein is in its top dead center position, as shown in the drawings, and is referred to as the normal or stopping position of the machine. Thus, for the purpose of this description, each machine cycle "begins" when the keyway in shaft 10 moves counter-clockwise (Fig. 4) from its dead center position, and "ends" when the keyway is returned thereto.

Record cards placed in card magazine 14 (Figs. 3 and 4) are successively passed, by means of picker knife 15, to feed rolls 16 which convey them to card sensing chamber 17. Each card is retained in the card chamber by card stop 18 during the period in which it is sensed by spring urged sensing pins 19, mounted in reciprocable pin box 20, and, then, is passed by the usual skid rolls (not shown) to eject rolls 21 by which it is conveyed to receiving magazine 22.

Picker knife 15 of the card feeding mechanism (Fig. 4) is connected to arm 23 (Figs. 6 and 7) secured to rock shaft 24 and is operated, through arm 25, link 26, arm 27, and follower 28 by card feed cam 30 secured to shaft 10. The card feeding mechanism is operated once during each cycle of operation and is held retracted by cam 30 when the machine is in its normal or stopping position as shown in the drawings.

The sensing pin box 20 (Fig. 4) is provided with a plurality of rows of spring-pressed pins 19, arranged to register with the perforation positions in the record cards, and is reciprocated once during each cycle of operation by a pair of eccentrics 30 secured to shaft 10. The arrangement of eccentrics 30 is such that, in the normal or stopping position of the machine, the pin box is raised to its highest position. Each column of sensing pins is provided with the usual locking slide 32 arranged to lock the pins in elevated position when they have passed through perforations in a card. The usual mechanism, indicated by lever 33, is provided to prevent the operation of slides 32 when there is no card in chamber 17.

*Change of designation unit*

Mounted in the frame of the machine above the sensing box is an intermediate pin box mechanism (Fig. 3) having the same function as the corresponding mechanism in Patent No. 2,044,119, namely, to retain the set-up contained in the record cards and to sense changes in the designation data in successive cards. The intermediate pin box mechanism shown in the drawings differs from the above cited patent in that it is designed to permit the use of the ninety column card and to permit different types of totals to be taken when different types of designation changes are sensed. This mechanism comprises a boxlike structure 41 provided with a plurality of columns of spring-pressed pins 42 arranged to register with sensing pins 19. The springs associated with pins 42 are stronger than the springs associated with pins 19, so that, in the event pin box 20 is elevated when there is no card in chamber 17, pins 19 are held down and do not elevate stops in the computing units. The sets of pins in each column, that correspond to the upper and lower zones of a record card, are each provided with a locking slide 43 that is urged rearwardly by springs 44. A plurality of locking noses on each slide 43 cooperate with studs on the associated pins 42 (Figs. 3 and 7) to hold the pins in raised position when elevated. Locking slides 43 are retracted, in the manner and for the purpose described in Patent 2,044,119, during the period in which the pins 42 are held up by pins 19, by means of bail 45 (Figs. 6 and 7), rock shaft 46, arm 47, push rod 48, arm 49, and retract cam 50, secured to shaft 19. Retraction of slides 43 releases all pins 42 that were elevated under control of the preceding card and permits them, unless held up due to a corresponding perforation in the new card, to be moved to their lower position by the associated springs.

The change of designation sensing mechanism includes a plurality of cam slides 51 (Figs. 3 and 7) arranged in a manner similar to locking slides 43, that is, a cam slide 51 being provided on each side of pins 42 that correspond to a column of perforation positions in the record cards. A plurality of camming faces on each slide 51 coact with studs on the associated pins 42, the arrangement being such that any change in the setting, that is, the raising, or lowering, of a pin 42 in any column serves to move the associated slide 51 forwardly (to the left in Fig. 3). The movement of slides 51 is utilized to initiate the operation of the total taking control mechanism. For this purpose, a plurality of variably settable finger tabs 52 (Figs. 3, 7, and 13), one for each cam slide 51, is slidably mounted on transverse comb pieces 53 (Figs. 3) and each is provided with a pivotally connected interponent member 54. Each tab 52 is manually settable to an upper, an intermediate, and a lower position in each of which it is retained by a detent spring arranged to engage with notches in the tab. The lower end of interponent 54 is so formed that, when tab 52 is in its upper position, movement of slide 51 is ineffective thereon. When tab 52 is placed in its intermediate position, as indicated at 52T of Fig. 7 interponent 54 is moved between the end of slide 51 and a bail rod 55 that is supported by arm 56 mounted on a rock shaft 57. Under these circumstances, movement of slide 51 serves to rock shaft 57 to initiate the operation of the total taking control mechanism as will be described hereinafter. When tab 52 is placed in its lower position, as indicated at 52G of Fig. 7, interponent 54 maintains an operative relationship between slide 51 and bail rod 55 and, in addition, a shoulder on the interponent establishes contact with a second bail rod 58 that is supported by arms 59 secured to rock shaft 60. Under these circumstances, movement of a slide 51 serves to rock shaft 57 to initiate the operation of the total taking control mechanism and, in addition, serves to rock shaft 60 to initiate the operation of additional control mechanism, hereinafter described, which causes a repetition of the operation of the total taking control mechanism and, at the end of the first group total taking operation, varies the control of the total taking control mechanism, which is normally arranged to cause group totals to be taken from the group total accumulators, to cause a total to be taken from the grand total accumulator.

Thus when a group total is to be taken upon a change of designation in a given column, tab 52, corresponding to that column, is set in its intermediate position; whereas, when a grand total is to be taken upon a change of designation in another column, tab 52, corresponding to that column, is set in its lowest position. Tabs 52 that correspond to the remaining columns are then set in their upper positions so that the movements of the associated slides 51 are ineffective.

The movements of pins 42 are transmitted to the computing mechanism, in the usual manner, by translator wires 65 (Fig. 3) mounted in a removable translator frame 66.

*Computing and printing*

The computing and printing mechanisms are included in the head section (Fig. 2) and are shown in conjunction with the familiar Powers direct subtraction and grand total mechanism. These units comprise a plurality of type sectors 172 pivoted on a cross shaft 173, the type sectors cooperating with the usual platen 174, and the gear sectors with the usual accumulator pinions 171. Cooperating with the types 175 are the usual hammers and releasing latches (not shown) which are fully described in Patent No. 1,245,502, issued to J. Powers November 6, 1917. The mechanism also includes the usual main rock shaft 176 having for each unit a cam sector 177 controlling a lever 178 which in turn controls the pitman 179 connected to the cam arms 180 which move the accumulators 171 into and out of mesh with the gear sectors. The mechanism also includes the usual total shaft 181 which when rocked clockwise in Fig. 2 sets the machine for taking a group total.

Figure 2:
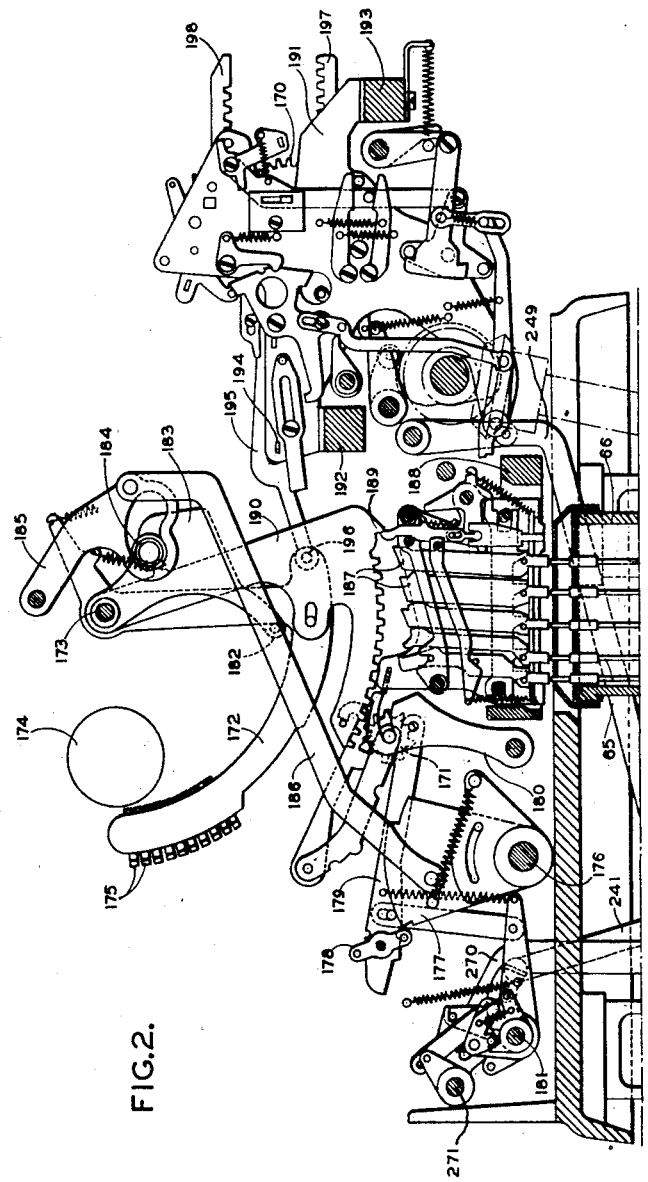

As shown in Fig. 2 in each unit the type sectors 172 are controlled by the usual bail rod 182 mounted on arms 183, one of which carries a follower roller 184 running in a cam slot in an arm 185 and connected by link 186 with the sector 177.

In each unit there is a stop basket containing a series of digit stops, or pins, 187 each normally held down by its own weight and slidably mounted in a frame 188. Each of these stop pins is adapted to be pushed upward by one of the translator wires 65, thereby engaging the heel 189 on the gear sector 190 when the sector is rocked to printing position. A detailed description of the structure and operation of this form of stop basket will be found in Patent No. 2,151,406, issued to W. W. Lasker, March 21, 1939.

The adding and subtracting unit comprises a framework including side plates, 191 each secured to bars 192, and 193, said side plates connected to each other by suitable frame pieces, one of which consists of a plate 194 which is embraced by the upper and lower branches of a series of forked links 195 each pivoted at 196 to the sector 172 which lies in front of it. Each of the forks of the links 195 is connected to the adding and subtracting racks 197 and 198. The teeth on subtraction rack 198 face downward and those on addition rack 197 face upward and between them the accumulator pinions 176 are rotatably mounted on a shaft (not shown), which shaft and pinions 176 are movable up and down to three positions, namely, an upper or subtracting position, a central or neutral position, and a lower or adding position as shown in Fig. 2.

The transfer and algebraic mechanism is described in the above mentioned Patent No. 2,066,406 and the arrangement is such that the front accumulator is conditioned to non-add during the accumulating operations so that the quantitative data taken from the record cards is entered only in the rear accumulator. When a group total is taken from the rear accumulator, the front accumulator is conditioned for an adding operation so that the total taken from the rear accumulator is transferred to the front accumulator during the group total taking operation. When a grand total is to be taken, the total of the last group of items is transferred to the front accumulator, and then the grand total is taken therefrom. Grand total taking is completed during a series of operations, in the first part of which the rear accumulator is conditioned for total taking and the front accumulator is conditioned for accumulating to effect the necessary transfer. In the latter part of the series of operations, the front accumulator is conditioned for total taking, whereby the grand total is printed and the rear accumulator is conditioned for a non adding operation to prevent an improper transfer of the grand-total.

Total taking control

In order that group totals and grand totals may be taken upon changes in designative data, a total taking control mechanism is provided that is arranged to control a group total taking operation, upon a change in the group designation, during which the total is taken from rear accumulator 170, and to control a grand total taking operation upon a change in grand group designation, during which the group total of the last group of cards is taken from accumulator 170 and, then, the grand total of all the preceding group totals is taken from accumulator 171. The mechanism for effecting these operations is based upon the principles disclosed in Patent No. 2,044,119. As disclosed in the cited patent, when a card with a new designation is sensed, a total taking operation is initiated during which the total taking control mechanism operates to perform five distinct functions. These functions are: (1) Suspension of card feeding during the entire total taking operation, (2) Retention of the new card in the sensing chamber for the same period, (3) Disabling of the latch retaining mechanism so that the sensing pins are freed also for the same period, (4) Rocking the front or rear total shaft of the computing mechanism during the total taking cycle, and (5) Restoration of the total taking control mechanism to ineffective position at the end of the total taking cycle thereby permitting resumption of ordinary accumulating operations.

Figure 13:
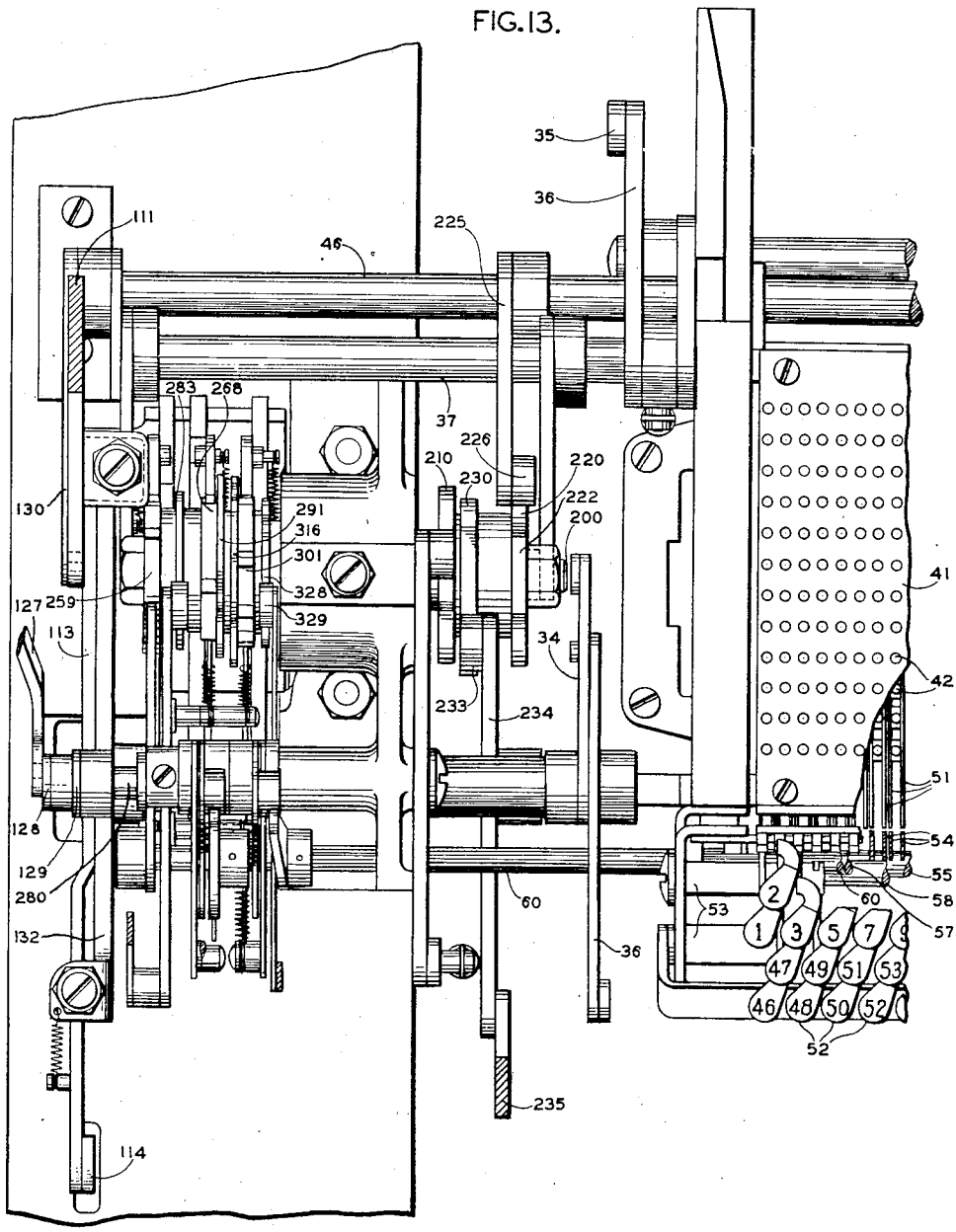
Fig. 13 is a plan view of the total taking control mechanism.

The mechanism for performing the above functions consists of a plurality of cams shown in Figs. 6, 7, and 13 mounted on a common shaft 200 and a stepping device, operable by a cam on the main drive shaft of the machine, for actuating the common shaft. The total taking control mechanism is designed primarily for controlling group total taking and grand total taking operations in a machine having computing mechanism in which group totals are transferred to another accumulator during group total taking. For controlling these operations, the mechanism performs the five functions listed above for a group total taking operation, and two additional functions for the grand total taking operation. These additional functions occur prior to the last or restoring step of the above mentioned functions and are, (4a) Shifting the control of total taking mechanism from group total control position to grand total control position at the end of the group total taking cycle, and (4b) Rocking the grand total shaft of the computing mechanism during the grand total taking cycle.

When a card with a new group designation is sensed, the operation of the actuating mechanism is initiated and this mechanism serves to rotate shaft 200 through one-third of a revolution in three steps during two machine cycles. The mechanism for actuating shaft 200, for group total taking is essentially the same as that disclosed in Patent No. 2,044,119. In the first step, certain operating cams secured to shaft 200 (Figs. 6 and 7) vary the normal accumulating operation of the machine and control a cycle of the machine, conditioning it for the cycle to follow. In the second step, these cams control a group total taking cycle. In the third, the total taking control mechanism is restored to ineffective position to permit resumption of ordinary accumulating operations. As in Patent No. 2,044,119, the construction of the control mechanism is such that a complete revolution of shaft 200 is completed in nine steps. Therefore, since the cams secured thereto perform their functions in three steps, each cam is provided with three separate working segments. Thus, after shaft 200 is actuated through three steps, the cams thereon are, in effect, returned to their original position.

Actuating mechanism of total taking control

The mechanism which controls the group total taking and grand total taking operations consists of three actuating cams (Figs. 6 and 7) 210, 220, and 230 which are secured to shaft 200; three ratchet wheels 301, 268, and 259; three control cams 326, 316, and 283; and one detent wheel 261. All the above are securely mounted on shaft 200 except the ratchet wheel 301 and two cams 326 and 316 which are secured to a sleeve 300 rotatably mounted on shaft 200.

Power for actuating this assembly is derived from shaft 10 by means of two snail cams 250 and 260 coacting with two rollers 251 and 261 to raise actuating bars 254, 304, and 264. The ends of these bars engage three ratchet pawl assemblies which cooperate with the ratchet wheels to turn the shaft 200 and sleeve 300.

Cam 210 (Fig. 6) is used to hold the card picker mechanism in ineffective position so no cards are fed during total taking.

Cam 220 (Fig. 7) is used to retract the retaining latches 43 to free interponent pins 42 when a new card is about to be sensed. This is accomplished by means of the follower roller 226 on the end of arm 225, rocking the shaft 46 which causes the engagement of the latches 43 by the bail 45. Cam 220 also serves as an auxiliary card stop means. The card stop mechanism consists of the usual cam 40 secured to shaft 10 which cams a lever and rocks shaft 37 once each revolution. The rocking of shaft 37 moves arms 36 and 35 and lever arm 34, thereby raising card stop 18 out of the path of a card in the sensing chamber. During normal sensing operations, the card stop is lifted once each cycle to allow the card to be fed out of the sensing chamber, but when the total taking operations are in progress, the card must remain in the chamber for several cycles. This is effected by the rotation of cam 220 so that the raised portion 222 engages the roller 223 at the time the cut out portion of cam 40 is normally engaged by its roller.

Cam 230, also secured to shaft 200, serves to provide vertical movement for link 235 by means of roller 233 and lever 234. Once during each group total taking operation and twice during each grand total taking operation this link is lowered to actuate lever arms 240 or 245 (Fig. 14).

Cam 326 is secured to sleeve 300 and turns only when a grand total is to be taken. The follower roller 329 is normally resting on the cut away portion 328 of the cam and the lever 330, acting through bar 331, bell-crank 333 and bar 335, pulls the link 235 (Fig. 14) into engagement with pin 237 on lever 240. As soon as the sleeve 300 is rotated, the lever 330 is cammed clockwise and the link 235 is allowed to spring into engagement with pin 244 on lever 245.

When a group total taking operation is initiated, shaft 200 and its associated elements (cams 210, 220, and 230) are actuated through a three step sequence of operations. This actuation is effected by snail cams 250 and 260 secured to shaft 10. The cams are offset, relative to each other, so that each may cause an actuation of shaft 200 at different times in the same machine cycle. This arrangement, in addition to the arrangement of the teeth on ratchets 259 and 268, is such that shaft 200 is actuated twice during the first cycle and once during the second cycle of a group total taking operation. In the first cycle, the first actuation of shaft 200 is effected immediately after the beginning of the cycle by cam 260, whereas the second actuation of shaft 200 is effected at the end of the cycle by cam 250. In the second cycle, shaft 200 is actuated at the end of the cycle by cam 250. The several steps through which shaft 200 is operated during a group total taking operation are as follows:

The first step of shaft 200 is effected by cam 260 immediately after the beginning of the cycle following the sensing of a change in group designation and serves to position cams 210, 220, and 230 so that the cycle, which began as an ordinary accumulating cycle, is converted to the first or group total conditioning cycle of a group total taking operation.

The second step of shaft 200 is effected by cam 250 at the end of the first group total machine cycle and serves to position cams 210, 220, and 230 for causing the second group total machine cycle of a group total taking operation.

The third step of shaft 200 is effected by cam 250 at the end of the second group total taking cycle and serves to normalize cams 210, 220, and 230 whereby the machine is conditioned to resume ordinary accumulating operations in the succeeding cycle.

Thus, shaft 200 is actuated through three steps during the two machine cycles required for a group total taking operation. As a result, the cams 210, 220, and 230 are rotated through a three-step sequence of operation during which the group total is taken from rear accumulator 170, printed on the report sheet, and transferred to front accumulator 171.

When a grand group total taking operation is initiated, additional mechanism, comprising sleeve 300, serves to cause two successive three step sequences of operation of shaft 200 and its associated elements. Sleeve 300 is arranged to be actuated only by cam 260 immediately after the beginning of each cycle of the grand total taking operation, whereas, due to the offset relationship of cams 250 and 260 and the arrangement of teeth on ratchets 259 and 268, shaft 200 may be actuated at different times in the same cycle. The latter arrangement is such that shaft 200 is actuated twice during the first cycle, once during the second cycle, twice during the third cycle, and one during the fourth cycle of the grand group total taking operation. In both the first and third cycles, the first actuation of shaft 200 is effected immediately after the beginning of the cycle by cam 260, and the second actuation of shaft 200 is effected at the end of the cycle by cam 250. In both the second and fourth cycles, shaft 200 is actuated at the end of the cycle by cam 250. The several steps through which shaft 200 and sleeve 300 are operated during a grand total taking operation are as follows:

The first step of shaft 200 is effected by cam 260 immediately after the beginning of the cycle following the sensing of a change in grand group designation and serves to position cams 210, 220, and 230 so that the cycle which began as an ordinary accumulating cycle is converted into the first machine cycle of a grand total taking operation. This movement occurs simultaneously with the first step of sleeve 300 which is also effected by cam 260. This cam raises roller 261 and with it offset bar 304 which engages and raises ratchet lever 305 which has been unlatched due to the action of lever 306 secured to the end of shaft 60.

The second step of shaft 200 is effected by cam 250 at the end of the first machine cycle and serves to position cams 210, 220, and 230 for causing the second machine cycle of a grand total taking operation. Immediately after the beginning of the second machine cycle sleeve 300 is actuated a second step by cam 260.

The third step of shaft 200 is effected by cam 250 at the end of the second machine cycle and serves to normalize cams 210, 220, and 230 whereby the machine tends to resume ordinary accumulating operations in the succeeding cycle.

The fourth step of shaft 200 is effected immediately after the beginning of the third machine cycle and serves to position cams 210, 220, and 230 so that the third machine cycle is converted into the grand total conditioning cycle of a grand total taking operation. This movement occurs simultaneously with the third step of sleeve 300 which is also effected by cam 260. The third rotation of sleeve 300 causes roller 329 to ride up on the high dwell of cam 326, pulls down the link 331, rotates shaft 333 counter-clockwise, moves link 335 to the right (Fig. 7) and carries with it link 235. The total-taking link 235 is now in the position indicated by the dotted lines in Fig. 14.

The fifth step of shaft 200 is effected by cam 250 (Fig. 6) at the end of the third machine cycle and serves to position cams 210, 220 and 230 for causing the fourth or grand total taking cycle of a grand total taking operation. Immediately after the beginning of the fourth machine cycle, sleeve 300 is actuated a fourth step by cam 260 (Figs. 6 and 7). This normalizes cam 300 and places it in condition for the next grand total taking operation. During the fifth step when the total taking link is lowered, the pin 244 will be engaged and lever 245, shaft 246, and lever 248 will be turned clockwise as viewed in this figure. As a result of this action, link 270 (Figs. 2 and 9) is lowered rotating shaft 271 which causes a grand total to be printed from the front accumulator 171. Also bar 249 is moved transversely to the rear of the machine causing the zero stops to be released and the rear accumulator 170 to be placed in a non-add position. The details of the accumulator operations during a grand total taking operation are described in Patent 2,066,406, mentioned above.

The sixth step of shaft 200 is effected by cam 250 at the end of the fourth machine cycle and serves to normalize cams 210, 220, and 230 whereby the machine is conditioned to resume ordinary accumulating operations in the succeeding cycle.

Thus, shaft 200 is actuated through six steps during the four machine cycles required for a grand total taking operation. As a result, the cams 210, 220, and 230 are rotated through two successive three-step sequences of operation. During the first sequence, the last group total is taken from the rear accumulator 170, printed on the report sheet, and transferred to the front accumulator 171. During the second sequence, the grand total is taken from the front accumulator 171 and is printed on the report sheet.

*Automatic stop unit*

The principal motivating impulse which is used to drive the automatic stop unit is derived from the motions of the total taking link 235. As has been described above, this link is pulled downward each time a total of either kind is to be taken. During a group total the link is held toward the rear of the machine and during a grand total it is rocked toward the front. A lever 61 (Figs. 3, 9, and 14) with a turned-over nose 62 is adjustably mounted on a plate 63 by two bolts sliding in slots. The plate 63 is pivotally mounted on the main frame of the tabulator by means of a pivot 64. Secured in link 235 is a pin 67 which may be engaged by the nose 62 of lever 61 provided its setting agrees with the position of the link 235.

Fig. 14 indicates a position of the lever 61 in full lines cooperating with the pin 67 on link 235 when the lever is in a position to count the number of group totals. The dotted lines indicate its position when adjusted to count the number of grand totals.

Figure 3:
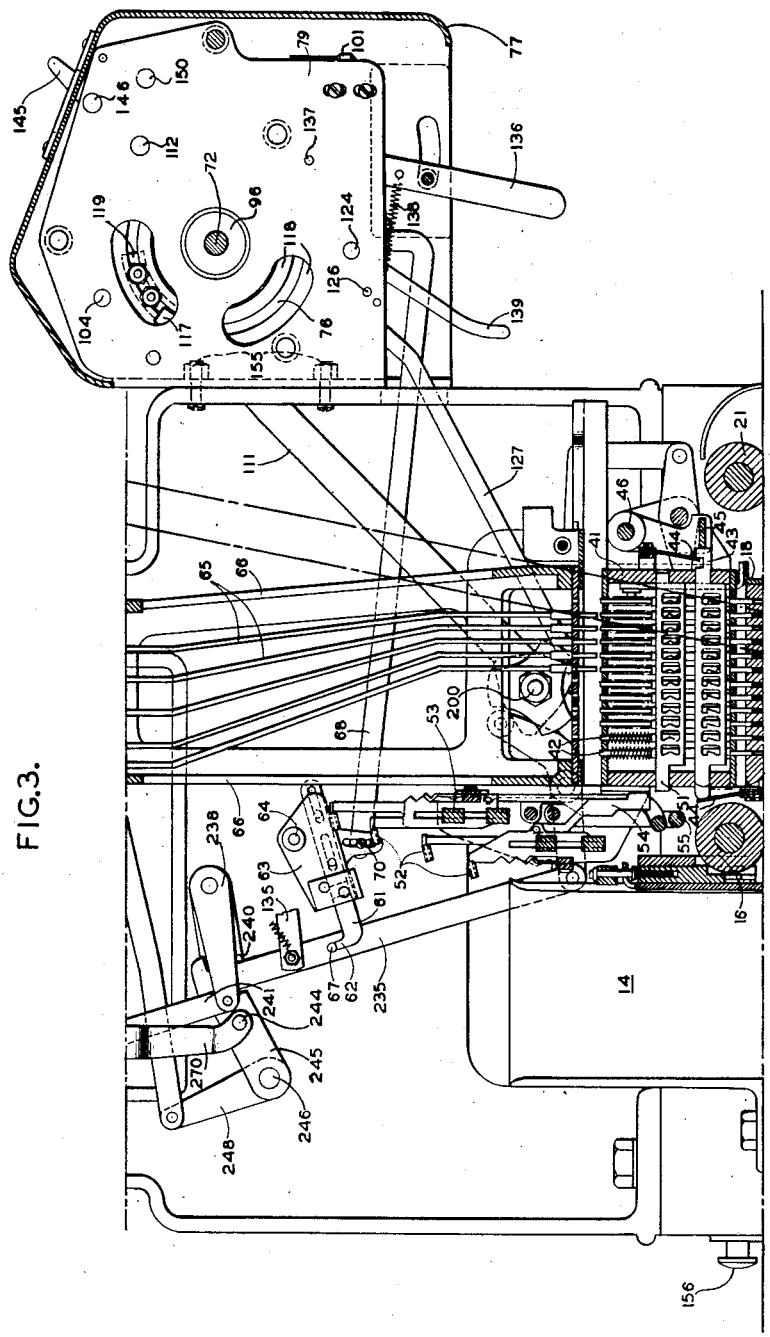

When the nose 62 of the lever 61 is formed as shown in Figs. 3, 9, and 14, and positioned as indicated in Fig. 3, only group totals will be counted by the stop unit. When the link 235 is moved to the front of the machine to register a grand total, the pin 67 will not engage the nose 62 and no counting operation will occur.

If it is desired to adjust the machine so that both group and grand totals will be counted, the lever 61 is removed and a broad nosed substitute 61A put in its place. Fig. 17 indicates the manner in which the nose 62A is engaged in either front or back position of link 235.

The lever 61 is rocked about the pivot 64 by the pin 67 on link 235 when said link is lowered by the action of cam 230 and lever 234 as described above. The rocking motion of lever 61 and its supporting plate 63 is communicated to the automatic stop mechanism by a link 68 which is pivotally attached to plate 63 by a bolt 70. The other end of link 68 extends into the base of the automatic stop unit where it is connected to the lower end of a lever 71 (Fig. 10) which is pivoted about a shaft 72. A spring 149 tends to hold the link 68 and its associated mechanism in non-operating position, thereby providing the necessary return force when the link 235 is raised. The upper end of lever 71 carries a pivoted pawl 73 whose nose 74 engages teeth 75 on a ratchet wheel 76.

Figures 11, 12:
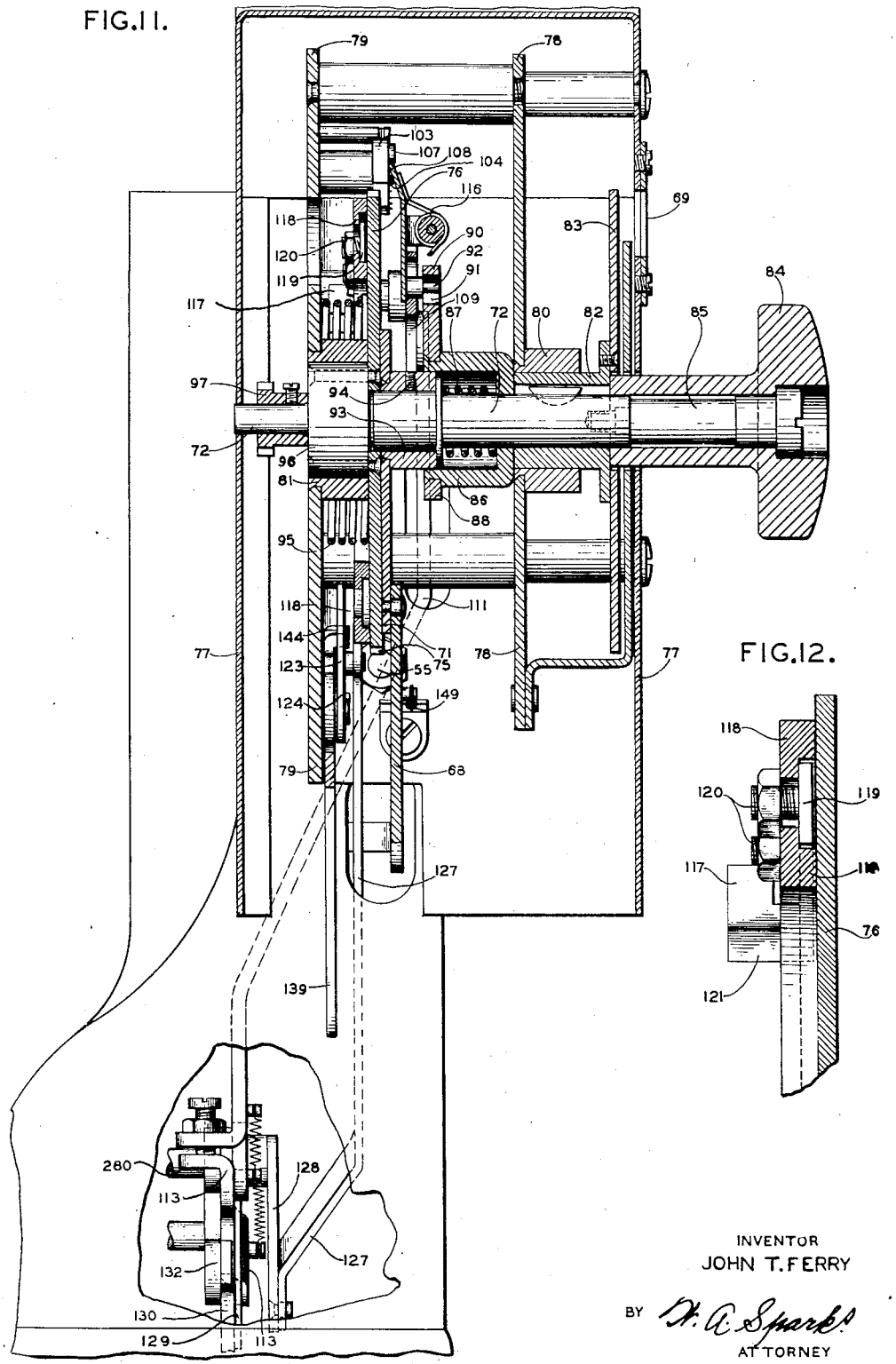
Fig. 11 is a cross section taken through line 11—11 of Fig. 9, with a showing of some of the connecting linkages in dotted lines.
Fig. 12 is a detail cross section of the ratchet wheel showing the method of attaching the stop lug.

The enclosing framework 77 of the automatic stop unit is secured to the rear of the tabulator by two bolts 155. Inside the frame 77, two plates 78 and 79 (Fig. 9) are mounted to serve as supports for other mechanism. In the central portion of each plate, bearings 80 and 81 (Fig. 11) are secured and in the former, a sleeve 82 is rotatably mounted to which is secured a circular dial 83. Graduations are engraved on the face of the dial and numbered from 0 to 100 (Fig. 9), each graduation corresponding to a tooth on the ratchet wheel 76. The graduations on the dial 83 are viewed by the operator through a window 69 (Fig. 1) in the enclosing cover 77.

The sleeve 82 which carries the dial 83 is keyed to shaft 72 so that they must rotate together but permitting the movement of the sleeve along the shaft in a direction parallel to its axis.

A knob 84 is attached to one end of shaft 72 by a screw 85 so that the shaft and its associated parts may be manually set by the operator. Adjoining the sleeve 82 is a cup member 86, rotatably mounted on shaft 72 and co-axial with it. A helical compression spring 87 is positioned within the cup 86 and coiled about the shaft 72 and exerts pressure on a washer and sleeve 93 which fit into the open end of cup 86. The sleeve 93 is secured to the shaft 72 by a set screw 94. A flat plate 88 (Figs. 10 and 11) is riveted to the rim of cup 86 and has an upwardly extending portion 90 into which portion is cut a slot 91. A pin 92, which is attached to a plate 108 secured against rotation about the shaft 72, engages the slot 91 and holds the cup assembly in a non-rotating position.

The rear bearing of shaft 72 consists of a cylindrical member 81, secured to the back plate 79 and rotatably supporting a circular block 96 to which is secured the ratchet wheel 76. The block 96 is an integral part of shaft 72. A helical spring 95 is coiled about the bearing 81 with one end attached to the back plate 79 and the other end attached to the wheel 76, tensioned in such manner as to give the plate a tendency to rotate in a counter-clockwise direction when viewed from the handle end of the shaft. Adjoining the block 96 and secured to shaft 72 is a gear 97 (Fig. 10) which meshes with a gear segment 98. The segment 98 is used to limit the speed of return of the ratchet wheel 76 and for this reason it is connected by a bearing and arm 99 to a plunger shaft 100 in a dash pot 101.

As has been hereinbefore described, the transverse movement of rod 68 rocks the lever 71 about its bearing 72 and thereby moves the pawl 73 an amount slightly in excess of the tooth spacing on the ratchet wheel 76. The pawl 73 is sprung into engagement with the teeth 75 by a spring 102, the lower end of which is attached to a stud secured to the back plate 79. A second pawl 103, used for retaining means only, is pivoted by a screw 104 and urged against the teeth 75 by a spring 105. Both pawls 73 and 103 have studs 106 and 107 attached to their noses which cooperate with a plate 108 which holds both pawls out of engagement with the ratchet wheel when the tabulator clutch is thrown out of engagement.

The plate 108 is pivotally attached to projections on a disengaging plate 109 which in turn is rockably mounted by a bolt 110. A link 111 is attached to a projection on the disengaging plate and serves to rock the plate about its pivot 110 within narrow limits which are fixed by a limit pin 112. The link 111 (Figs. 9 and 11) has its other end attached to a lever arm 113 which is rocked each time the clutch is operated. Connection is made through linkage 114 (see Fig. 1) and arm 115 to the shaft 12, on which a control lever 160 is secured. The control lever positions one plate 161 of a disc clutch, the other plate 162 being driven by a belt and pulley combination 163 which in turn is driven by an electric motor 164. Each time the clutch 161—162 is engaged by the lever 113 being moved in a counter-clockwise direction (as seen in Fig. 1) the link 111 is lowered. When the clutch is disengaged, the reverse happens.

The plate 108 is urged by a spring 116 so that its topmost edge tends to engage the studs 106 and 107. Under normal conditions the pawls are held out of engagement as long as the clutch is disengaged but there may be circumstances requiring a temporary setting of the ratchet wheel for a smaller number of total taking operations than results from the permanent setting. The temporary setting is made while the clutch is disengaged by rotating the ratchet wheel manually by means of the knob 84 to the required setting as indicated by the dial 83. When a manual setting is made, the dial is positioned at the graduation which is the difference between the number of totals desired and the number of totals obtained by the regular setting. For example, if the machine is set to stop automatically at the end of 28 totals and the operator wishes to have the machine stop at the end of 16 totals, the dial should then be set manually at 12. Then the knob 84 is pressed inwardly (see Fig. 11) which transversely displaces sleeve 82, cup 86, plate 88, and pin 92 which is secured to plate 108, thereby rotating the plate about its pivot and disengaging its upper edge from the studs 106 and 107 and allowing the pawls 73 and 103 to engage the ratchet teeth 75. The pawls retain the ratchet wheel in position against the return action of the helical spring 95.

The operation described above relates to temporary settings which are caused by unusual operating conditions. During the time in which the machine is functioning in a normal manner there is no need to touch the knob 84. A stop lug 117 (Figs. 10, 11, and 12) is adjustably secured to wheel 72 by two bolts and the position of this lug determines the number of totals which will be taken before the machine is automatically stopped. After each stoppage, it is only necessary to push button 156 to resume operations.

The pre-set stop lug 117 (Figs. 10, 11, and 12) is slidably bolted to the rear face of ratchet wheel 76 by means of two annular brackets 118, concentrically positioned, and welded to wheel 76. The stop lug consists of a flat portion 119 which slides in the annular space between a pair of retaining rings 119 and supports the heads of the bolts 120, and an operating nose 121 (Fig. 16) which engages a projection 122 on a stop plate 123. The stop plate 123 is pivotally mounted on the back plate 79 by means of a bolt 124. Directly behind the stop plate 123 is a pawl 139, rotatably mounted on bolt 124 and urged by spring 125 for clockwise rotation. A bent-over portion 144 of the pawl 139 engages the edge of plate 123 and resiliently positions it against a limit pin 126. Pivotally attached to the stop plate 123 (Fig. 9) is a link 127, the other end of which is fastened to an arm 128 which controls the stop arm 129. When the nose 121 on wheel 76 engages the projection 122 and rotates the plate 123 about its pivot 124, the link 127 is moved transversely toward the rear of the tabulator and the stop arm 129 is rotated on its shaft 200, forcing an interponent 130 between an upwardly moving arm 131 and the end of a lever 132.

The arm 131 is rotatably mounted on the cam follower 49 (see Fig. 1) which is moved upwardly only when a lug on cam 50 passes under the contact roller. The cam 50 is keyed to the operating shaft 10 in such a position that the cam follower 49 and arm 131 are raised only at the end of a machine cycle, therefore, no matter when the interponent 130 is moved between the lever 132 and the arm 131, the rocking of lever 132 is effected only at the end of the machine cycle.

When the lever 132 is rocked, arm 113 is forced down due to a bent over portion on the forward end of the lever (Figs. 1 and 9). This action is in turn communicated to linkage 114, arm 115, shaft 12, and control lever 160, thereby disengaging clutch plate 161 from plate 162 and stopping the machine.

Figure 10:
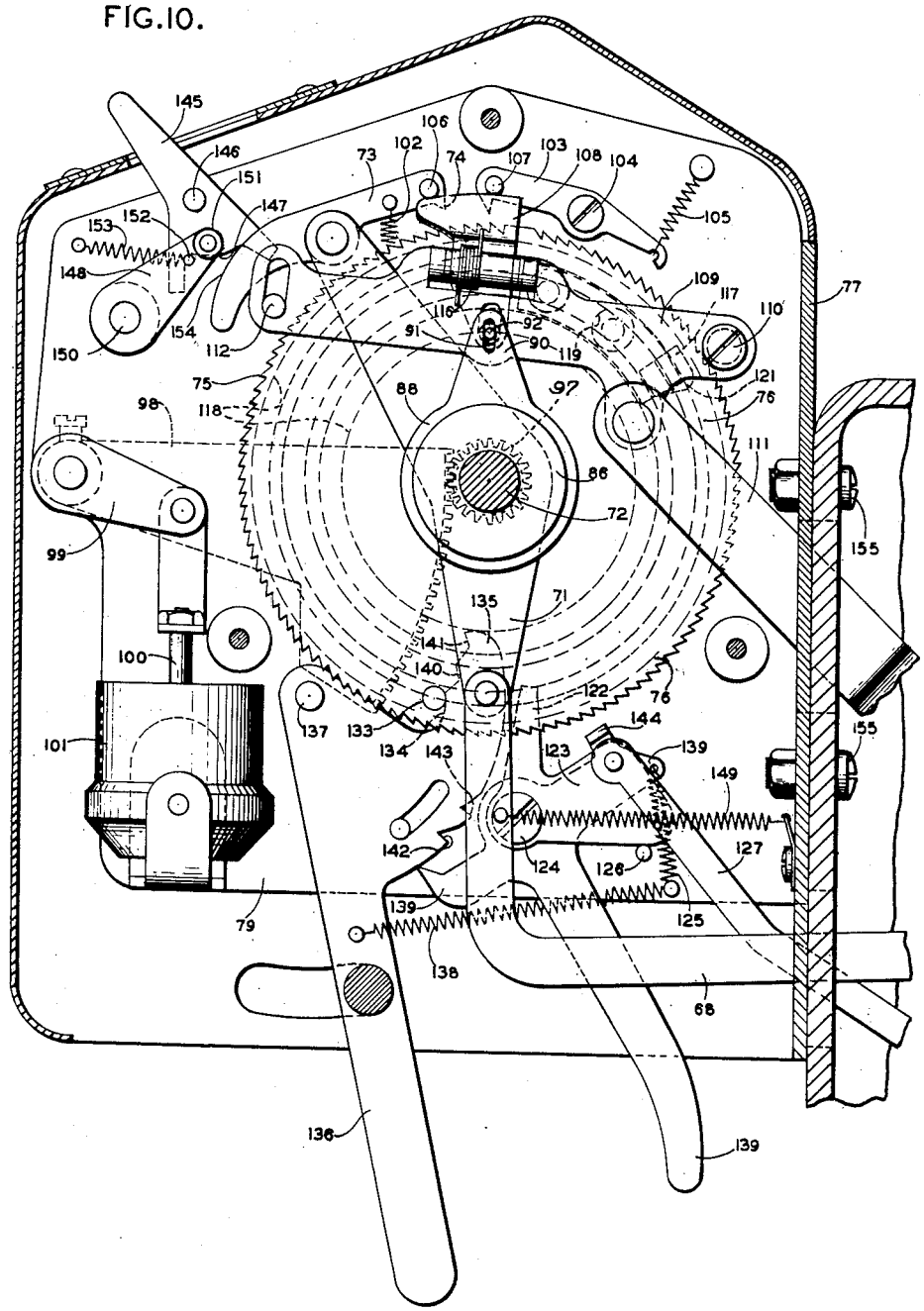
Fig. 10 is an enlarged vertical section of the automatic stop mechanism showing in detail some of the component parts.

When the machine has been stopped by a series of predetermined total taking operations, the link 111 is raised, thereby rocking plate 109 and disengaging both pawls 103 and 73. This action allows the ratchet wheel to turn back under tension of spring 95 to its normal starting position, slowed up in its return by the gear segment 98 and the dash pot 101. As shown in Fig. 10, a pin 133 secured to the face of ratchet wheel 76 limits against a face 134 formed on a projection 135 which is part of a settable lever 136, said lever being rotatably mounted by a bolt 137 and urged in a counter-clockwise direction by a spring 138.

When the machine is to be started again, the lever 136 is left in the position indicated in Fig. 10 and the same sequence of operations is performed. If, however, the machine is to be started with a new stack of cards and no card in the sensing chamber, a group and grand total will always be taken if the designation control is set for grand totals, since the first card injected into the sensing chamber will always be different from no card at all. Therefore, when starting the machine with no card in the sensing chamber, the lever 136 must be turned so that the pin 133 limits against the face 140 if group totals are to be counted, and the face 141 if grand totals are to be counted. The faces 134 and 140 are offset from each other an amount equivalent to one tooth of the ratchet wheel 76. Faces 140 and 141 are offset a similar amount so that by rotating the lever 136 clockwise the full amount, two additional movements of bar 68 are necessary before the ratchet wheel regains its zero position. Two teeth 142 and 143 are provided on the edge of lever 136 for engagement by the nose of pawl 139 to hold said lever in position until the machine is automatically stopped. When the nose 121 of the stop stud 117 engages the projection 122 and rotates it about its pivot bolt 124, part of the plate 123 engages a bent-over portion 144 of the pawl 139 and rotates it along with the plate 123. This action releases the lever 136 allowing it to assume the position indicated in Fig. 10. Thereafter all subsequent starts will begin with the pin 133 resting on the face 134 unless the lever 136 is manually set to one of the two other positions.

The automatic stop mechanism may be disabled by holding the pawl 73 out of engagement. This may be conveniently accomplished by a manually operated cam lever 145 (see Figs. 9 and 10) which is pivoted on a pin 146 and is provided with a cam edge 147 at its lower extremity.

Mounted below the lever 145 is a pivoted arm 148 turning on a shaft 150 with a roller 151 mounted on the free end of the arm. A pin 152 is secured to the arm 148 and supports one end of a spring 153 which tends to pull the arm in a counter-clockwise direction. The pin 152 also is engaged by the cam face 147 in such manner that when the cam lever 145 is pushed to the non-operating position, the cam face 147 cams the pin 152 downwardly, pressing the roller 151 on the rear top surface 154 of the pawl 73, thereby raising the nose 74 and holding it disengaged from the teeth 75.

Manual setting of the lever 136 is necessary only in starting the day's run or when no cards are in the sensing chamber. On all other occasions the stop unit is fully automatic, counting the totals, stopping the machine after the predetermined number has been taken and then resetting its dial for the next series. Therefore, the operator need only press the start-stop button 156 (Fig. 1) to resume the tabulation of the data from the record cards.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

In a machine of the class described, the combination of a driving means, a clutch for connecting said driving means to the machine, a control means for controlling the operation of taking a total, said control means comprising a link which is operated once during each total taking operation, means for shifting the link from its normal total taking position to a position where grand total taking operations may be controlled, a ratchet disc having teeth on the periphery thereof, a settable stop lug mounted on the ratchet disc, an actuating pawl for engaging the teeth on the ratchet disc, direct coupling means between the link and the actuating pawl for rotating the ratchet disc one tooth space for each total taken by the machine, said direct coupling means comprising a lever manually adjustable to one of two positions to be selectively engaged by the link in either its normal position or in its shifted position, whereby normal total taking operations or grand total taking operations may be counted by the ratchet disc, a rockable lever positioned for operative engagement with said stop lug, and coupling means between said rockable lever and the clutch, whereby engagement of the stop lug with the rockable lever disengages the clutch and disconnects the driving means from the machine.

JOHN T. FERRY.